United States Patent [19]
Penninger

[11] 3,891,919
[45] June 24, 1975

[54] STORM-LIGHTNING DETECTOR

[76] Inventor: William Penninger, 1731 Cloverbrook Dr., Louisville, Ky. 40215

[22] Filed: Mar. 4, 1974

[21] Appl. No.: 447,888

[52] U.S. Cl. ................. 324/72; 325/364; 340/421
[51] Int. Cl. ............................................ G01r 31/02
[58] Field of Search ........ 324/72; 325/67, 363, 364; 340/224, 421; 73/170 R

[56] References Cited
UNITED STATES PATENTS

| | | | |
|---|---|---|---|
| 3,465,245 | 9/1969 | Fischer | 324/72 |
| 3,611,365 | 10/1971 | Lundquist | 73/170 R |
| 3,753,117 | 8/1973 | Downing | 73/170 R |
| 3,810,137 | 5/1974 | Bacon | 325/364 |

Primary Examiner—Alfred E. Smith
Assistant Examiner—Rolf Hille

[57] ABSTRACT

An electronic circuit to detect an approaching severe weather storms by detection of radio frequency signals emitted by lightning flashes within radio receiver range. Devices in accordance with the present invention, include at least two radio frequency receivers to be selectively tuned to receive radio frequency signals at different selected frequencies, each radio receiver having a signal output means connected to a switching device is actuated by substantially simultaneous output signals from each radio receiver as a result of reception of radio signals at the selected respective frequencies and where the switching device then activates a selected device to indicate simultaneous reception of such signals of selected frequency.

7 Claims, 3 Drawing Figures

STORM-LIGHTNING DETECTOR

BACKGROUND OF THE INVENTION

Most severe weather storms are accompanied by the occurrence of lightning flashes which result in a naturally occuring wide-band radio frequency transmission. The resulting transmission ordinarily interfers with reception of signals from radio broadcast transmission, but as described more particularly hereinafter can advantageously be utilized to detect the occurrence of the lightning flashes within the range of a radio receiver to indicate the approach of severe weather long before there is any other indication of the approach of the storm. In most cases, lightning induced interference can be heard on ordinary radio receivers three to four hours before the accompaning storm arrives in the area of the receiver, and long before the storm is visible.

There are many situations where an advance warning of an approaching storm is essential. For example in boating, farming and various other forms of recreation and occupation, it is necessary to detect approaching severe weather at the earliest possible time to avoid both property damage and personal injury.

Prior to the present invention, expensive complex devices for example, radar have been used to detect the approach of a storm but no previous satisfactory portable and economical means has been available. While the radio frequency signals generated by the lightning flashes are received on an ordinary amplitude modification (AM) radio receivers, tuned to a selected frequency can occur from other sources and since ordinary, single AM receivers cannot discriminate as to the source of the interference, there is not reliable indication as to the source of the interference, received by a single AM radio, results from the occurrence of a lightning flash and an approaching storm.

Other and still further objects, features, and advantages of the present invention will become apparent upon a reading of the following detailed description of one apparatus in accordance with the present invention.

SUMMARY OF THE INVENTION

In accordance with this invention, the above noted objectives are achieved by providing a lightning detection device including at least two radio frequency receivers tuned to receive selected different radio frequencies, where output signal means are provided from each receiver in response to reception by each receiver of a signal at the selected frequency. The output signals from the receivers are then supplied to a switching device which is actuated in response to reception of simultaneous signals from each radio frequency receiver and the switching device then actuates an indicator system indicating that signals at the selected frequencies have been simultaneously received by the radio receivers.

DESCRIPTION OF THE DRAWINGS

Referring now to the accompanying drawings which illustrate one device in accordance with the present invention.

DETAILED DESCRIPTION

Figure 1:
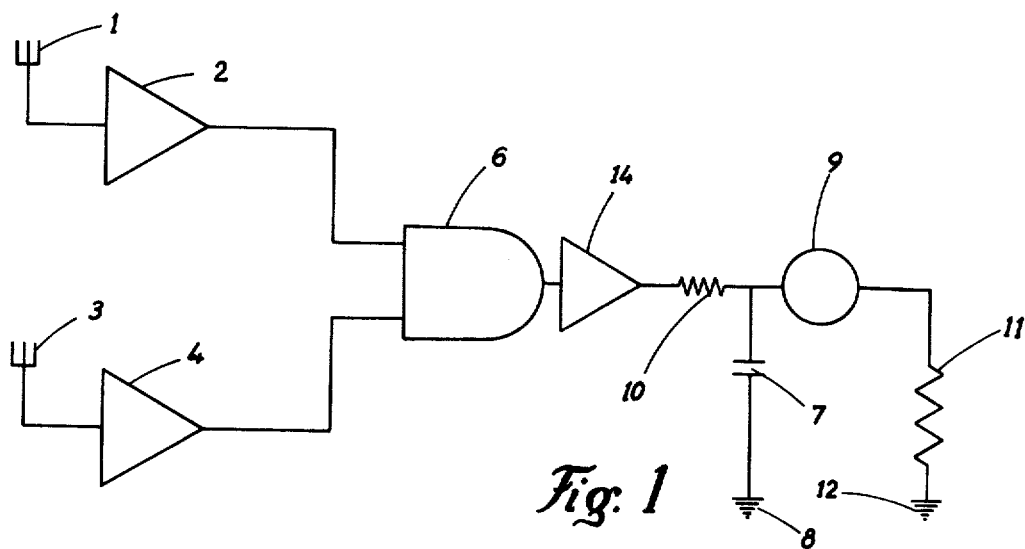
FIG. 1 is a block diagram of one embodiment of the present invention.

While FIG. 1 shows an arrangement providing two receivers 2 and 4 activating a switch means 6. It is to be understood that, within the scope of the present invention, more than two radio receivers tuned to different frequencies can be used in connection with devices provided by the invention to actuate the switch device upon receipt of signals at selected frequencies and that in some instances the use of additional receivers will improve the reliability of the device as well as the ability to discriminate between radio transmissions resulting from lightning flashes and radio frequency interference occuring from other sources.

Referring now to FIG. 1, a block diagram showing one embodiment of the present invention; the device includes a radio receiver 2 which, advantageously can be an amplitude modification (AM) receiver, having an antenna 1 where the receiver can be tuned for reception of radio frequency signal of selected frequency, a radio receiver 4 which like receiver 2 can be of the AM type, having an antenna 3 for reception of a radio signal where the receiver can be tuned to receive signals at a frequency different than the reception frequency of receiver 2. Receivers 2 and 4 are adapted so each provides an output signal to switching device 6 which is activated, as hereinafter described, upon generally simultaneous reception of signals from receivers 2 and 4.

An amplifier 14 can be provided and connected to switch 6 to amplify the signal received from receivers 2 and 4 and switching device 6. The amplified signal can then be transmitted to an indicator 9 as hereinafter described, for example, be an alarm, light, recorder, meter or other device to indicate reception of radio frequency signals by receivers 2 and 4 at the selected respective frequencies.

Within the scope of the present invention, the output signals from receivers 2 and 4, are fed through switch 6 and amplifier 14 and to a rectifier, from example a diode 13 and to a resistance-capacitance integrator whereby signals received by the radio receivers are converted to direct current pulses which can be stored in the circuit as hereinafter described. The resistance capacitance circuit includes resistor 10 and a capacitor 7 connected to ground 8 and the output from amplifier 14 to add the successive signals as previously described to prolong the signals to indicator 9, which is grounded at 12. In addition, a resistor 12 can be provided to reduce current flow and further elongate the period of the signals.

By the foregoing, as discussed hereinafter with respect to another example of a resistance capacitance circuit shown in FIG. 3, the charge-build up-discharge of the capacitor-resistor integrator can be prolonged to elongate the period of the indication shown by indicator 9.

Figure 2:
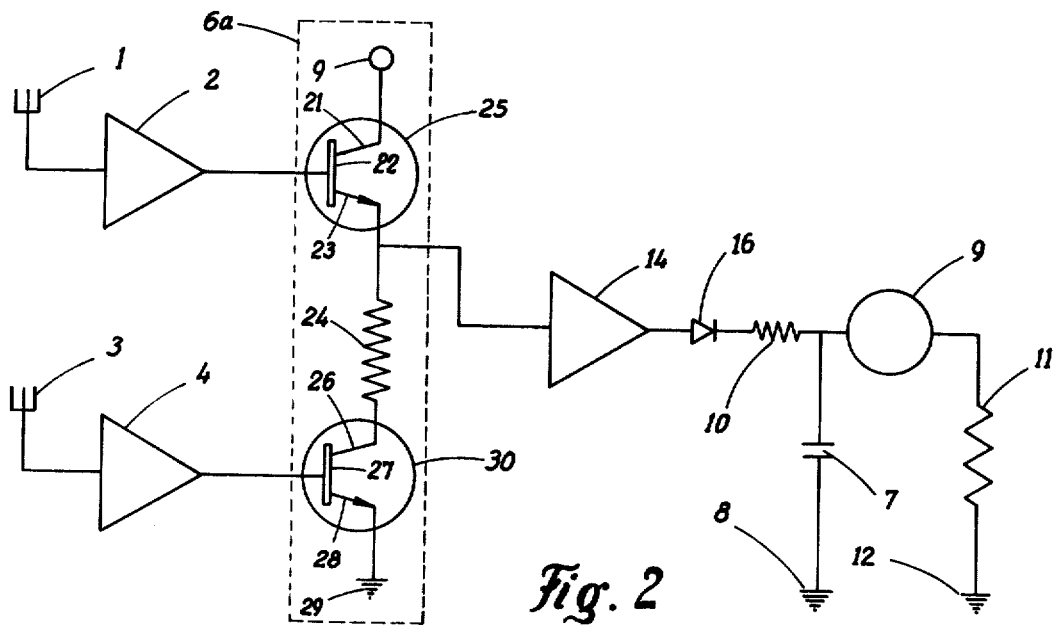
FIG. 2 is a partially schematic and partially block diagram of one embodiment of the present invention showing in particular one example of a switching arrangement useful in the present invention.

Referring now to FIG. 2, which shows in addition to the block diagram shown in FIG. 1, a schematic diagram of one example of a switching device 6 which, within the scope of the present invention, can be used to actuate the indicator 9 in response to reception of selected signals by antennas 1 and 3, as hereinafter described, the example of the switching device 6 shown in FIG. 2 is analogous to an AND gate. It will be understood that within the scope of the present invention a NAND gate can be provided to fulfill the function of switching device 6, and further that both mechanical and other electrical switching devices responsive to the simultaneous reception of signals from receivers 2 and 4 can be also used. A transistorized "AND" gate which can, for example, be an integrated circuit, has been found well suited for the applications contemplated by the present invention.

The example of one compatible switching device 6 shown in schematic in FIG. 2 includes a power supply 9 with transistors 25 and 30 in series circuit to a ground 29. Transistors 25 and 26 can be of the PNP type where, for example transistor 25 provides a collector 21, a base 22, and an emitter 23, while transistor 30 includes a collector 26, a base 27, and a emitter 28. A resistor 24 can advantageously be provided in the series circuit between the transistors 25 and 26 so that the principle signal received by amplifier 14 is the output from receiver 2. As shown, the output signal from receiver 2 is connected to the base 22 of transistor 25 while the output signal from receiver 4 is connected to base 27 of transistor 30.

Transistors 25 and 30 are advantageously selected so there is only insignificant current flow, if any, from power supply 9 through the circuit to ground, until a signal is received at base 22 and 27 of the respective transistors from the output of receivers 2 and 4 to initiate current flow from power supply 9 through the circuit to amplifier 14.

From the foregoing it is seen that, advantageously, at least one transistor switch can be provided in switch 6 for each radio receiver output signal. The transistors, or equivalent switching means, are connected in series so that significant current flows through the circuit from power supply 9 only upon activation of the transistorized circuit. The transistorized circuit of switch 6 should advantageously be selected so it is not so sensitive that a single input can fire the gate, nor should the gate be so insensitive that it will not fire unless all input signals are unrealistically strong. It is recognized that in some instances the signal received from the multiple radio receivers will vary somewhat in intensity. It is recognized that, advantageously pulse parameters, such as rise time, delay time, etc., are not of overwhelming importance in the application of the present invention, but consideration of such factors is in some cases advantageous.

Figure 3:
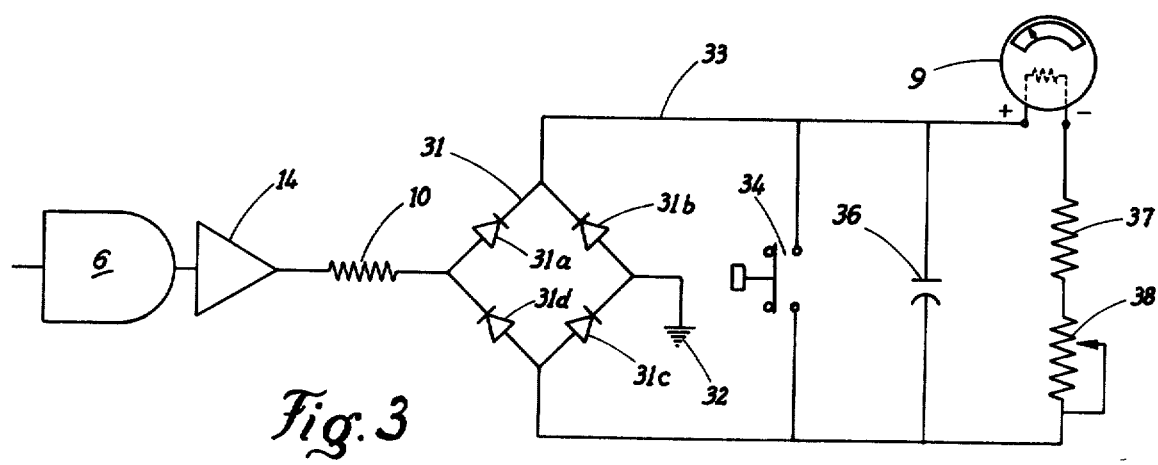
FIG. 3 is an expanded schematic diagram of a portion of the circuit shown in block diagram FIG. 1.

Referring now to FIG. 3, which illustrates another example of one arrangement within the scope of the present invention, for a resistance-capacitance integrator circuit and indicator means, the circuit shown provides a rectifier bridge 31, including individual rectifiers 31a, 31b, and 31c, grounded at 32. Rectifier bridge 31 is connected in a circuit 33 with the input to the rectifier bridge provided by the signal emitted from switch 6 to audio amplifier 14 through a resistor 21 of selected valve. The rectifier bridge advantageously converts the output pulse from audio amplifier 14 to direct current pulses and provides a very low impedance charging path for the capacitor, described hereinafter, and a very light impedance discharge path.

A push button 34 can be provided across circuit 33 in parallel with rectifier bridge 31 and a capacitor 36 can, advantageously likewise be provided in parallel across circuit 33. Indicator 9 is provided in series in circuit 33 with rectifier bridge 31. A fixed resistor 37, and a variable resistor 38 can likewise advantageously be provided in series with rectifier bridge 31.

Capacitor 36 advantageously provide a large capacitance capability to allow a long time constant for discharging the capacitor after reception of a signal transmitted through amplifier 14 to capacitor 36. Likewise, resistor 37 advantageously has a high resistance valve to elongate the time constant for discharge. A variable resistor 38 can be provided to allow some selective variation of the R-C integrator output.

Switch 34 is provided in circuit 33 for immediate discharge of vapacitor 36.

OPERATION

While it is recognized that the foregoing examples of one device within the scope of the present invention, will be ineffective with certain types of storms such as snow storms or other disturbances which are not accompanied by lightning flashes, most severe weather storms are accompanied by lightning and devices in accordance with the present invention are particularly effective in detecting the existence of such disturbances accompanied by lightning flashes. For purposes of the description of the operation of devices in accordance with the present invention, lightning can be considered a natural, wide-band radio transmitter received by all amplitude modification radios within range of the transmission from the lightning flash and are generally considered static.

In the present invention, as shown in the examples presented, the foregoing drawings and description, at least two radio receivers are used for the detection and verification of the occurrence of a lightning flash associated with a severe weather disturbance. In the example of the present invention shown, the two receivers 2 and 4 are tuned to receive selected but different frequencies in the radio broadcast band which are not assigned to transmitting stations in the particular area where the detector is located. Thus in normal operation, in the absence of storms with associated lightning flashes advantageously, no signal is received by either receiver 2 or 4. One of the frequencies selected for monitoring can, advantageously, be selected on the high range side of the radio broadcast band and the other radio can be tuned to a frequency on the low range side of the band to minimize the likelihood of false indication resulting from the reception of an errant transmission of signals from sources other than the wide band transmission associated with lightning flash. For example, in the event of localized interference transmitted in a narrow frequency band if the two receivers are tuned to receive widely separated frequencies one of the receivers may receive a signal which is not received by the other receiver. On the other hand, upon the occurence of a lightning flash, with the associated wide band transmission, the broad band is simultaneously received by antenna 1 and 3 of radio receivers 2 and 4 respectively. The simultaneous signals emitted from receivers 2 and 4 are emitted to base 22 of transistor 25 and base 27 of transistor 30 whereby transistors 25 and 30 become conductive to permit an electrical current pulse to flow from power source 9, which can for example be a battery, and where, depending on the characteristics of the power source, the characteristics of the transistors 25, and 30, and resistor 24 the current flow through.

Amplifier 14, is provided to amplify the signal and transmit the signal to the resistance-capactance integrator circuit, for example the circuit shown in FIG. 3. The signal from amplifier 14 is converted to a direct current signal by rectifier bridge 31 and each signal pulse is cupplied to capacitor 36 which is charged by or recharged by each pulse. The current resulting from the signal received by receiver 2 and 4 are accumulated in capacitor 36 to be fed through indicator 9 at a rate determined by the rating of capacitor 36 and resistors 37 and 38.

The read out from indicator 9 can be in the form of a strip chart, a light, or other alarm means. It has been found that a voltimeter or ohmmeter also provides a satisfactory means for readout. Because of the advantageous characteristic of the capcitance-resistance circuit it will be recognized that in the resistance-capacitance integrator circuit the energy stored in the system provides an indication of the total energy provided by the lightning flashes and therefore the total energy of electrical storms, as well as the distance of the storm from the location of the detector. Therefore, the energy stored gives some indication of the intensity of the storm approaching.

Thus when a meter or a strip chart indicator is used a direct indication of the severity of the approaching storms is given.

It will be recognized by those skilled in the art that various other arrangements can be provided within the scope of the present invention.

The invention claimed is:

1. A storm and lightning detecting device comprising: radio receiver means to receive radio signals at at least two different frequencies including first radio frequency receiver means having tuning means to receive radio signals of first selected frequency and output means to provide first output signal in response to reception of radio signals at said first selected frequency and at least one second radio frequency receiver means having tuning means to receive radio signals of second selected frequency and output means to provide second output signal in response to reception of radio signal at said second selected frequency; at least one first switch means connected to said output means of said first radio frequency receiver means and actuated by receipt of output signal from said first radio frequency receiver; and second switch means connected to said output of said second radio frequency receiver and actuated by receipt of output signal from said second radio frequency receiver; and indication means responsive to simultaneous actuation of said first and second switch means to indicate reception by said radio receiver means of radio frequency signals at said first and second selected frequencies.

2. The device of claim 1 including a series switch circuit wherein said first and second switch means are connected in series to a selected power source and said series switch circuit is adapted to provide flow of current from said power source to said indicator means upon simultaneous actuation of said first and second switch means.

3. The device of claim 2 wherein each said first switch means includes transistor means with the emitter and collector of each said transistor means connected in series and in series with said power supply means and the base means of each said transistor is connected to the output means of one of said radio receivers means.

4. The device of claim 3 wherein said series switch circuit includes electrical resistance means in said circuit between two of said first switch means and wherein said indicator means is connected to said series switch circuit between said resistor means and said first switch means next closest to said power supply means.

5. The device of claim 3 including a capacitance-resistance integrator circuit connected to said output means from said switch means between said switch means and said indicator means including rectifier means connected to said output means to provide undirectional flow of current, resistor means connected in series to said rectifier means and said indicator means and capacitance means connected in parallel with said resistance means.

6. The device of claim 3 including a capacitance-resistance integrator circuit including rectifier bridge means connected to output means of said switch means and to ground relative to said switch means; said rectifier bridge means being connected in series with said indicator means; selected resistor means connected in series with said rectifier bridge and said rectifier bridge means; and capacitance means connected in parallel across said rectifier means.

7. The device of claim 3 including signal amplifier means connected in series with said output means of said switch means and said indicator means.

* * * * *